Dec. 1, 1936.  E. F. GERTZ, SR  2,062,972
GREENHOUSE
Filed Feb. 7, 1936  2 Sheets-Sheet 1

INVENTOR,
Edward F. Gertz, Sr.

BY *Lancaster, Allwine and Rommel*
ATTORNEYS.

Dec. 1, 1936.  E. F. GERTZ, SR  2,062,972
GREENHOUSE
Filed Feb. 7, 1936   2 Sheets-Sheet 2

INVENTOR.
Edward F. Gertz, Sr.

Patented Dec. 1, 1936

2,062,972

UNITED STATES PATENT OFFICE 2,062,972

GREENHOUSE

Edward F. Gertz, Sr., Racine, Wis.

Application February 7, 1936, Serial No. 62,863

9 Claims. (Cl. 47—17)

This invention relates to improvements in greenhouses and an important object is to provide a greenhouse or plant starter having means for supplying heat to the seeds or plants therein, and means for supporting the seeds or plants either below or above the heating means.

Another object of the invention is to provide a greenhouse which may be heated either by oil or electricity.

A further object is to provide a greenhouse or plant starter having a heating system including a boiler and boiler heater housed exteriorly of the greenhouse.

A still further object is to provide a greenhouse having means for supporting seeds or plants in the upper portion thereof, said means also serving to support a heat radiator in subjacent relation to the seeds or plants.

Other important objects of the invention are:—to provide a greenhouse permitting ready access to the interior thereof; to provide a miniature greenhouse of a size easily movable from place to place; to provide a greenhouse which will be cleaner and less laborious than a conventional cold frame or hot bed; and to provide a greenhouse which may be readily and efficiently ventilated and which will provide protection against frosts.

Other objects and advantages of the invention will be apparent during the course of the following detailed description, taken in connection with the accompanying drawings, and in which drawings, Figure 1 is a perspective view of the improved portable greenhouse or plant starter showing a side panel in an open or ventilating position and showing the boiler housing in an open position whereby to permit access to the boiler and boiler heater.

Figure 1:
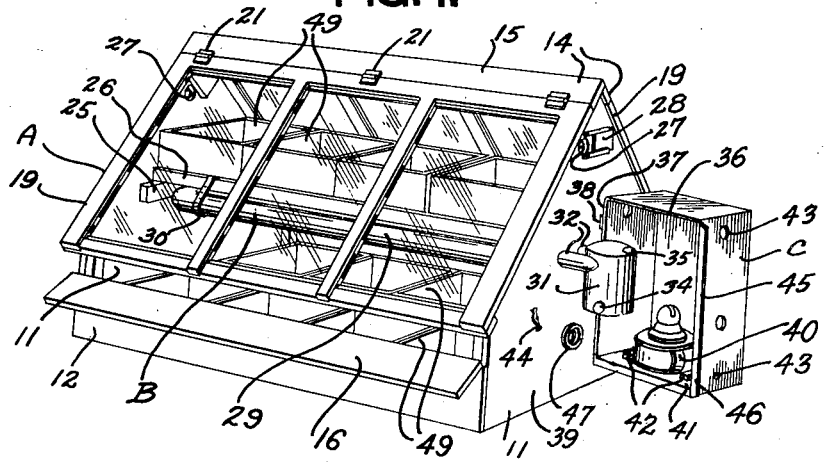
Figure 2:
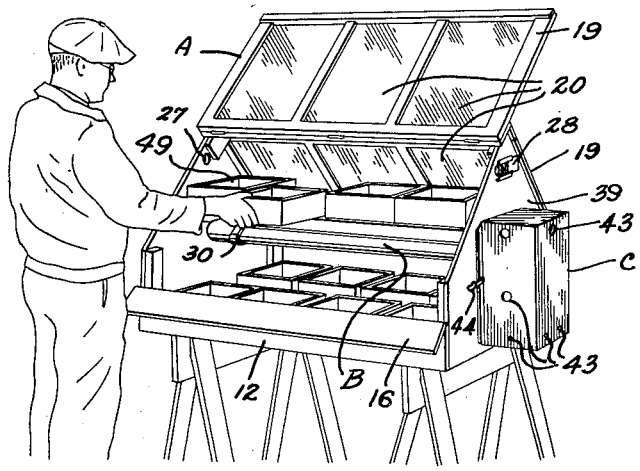
Figure 2 is a perspective view of the improved greenhouse showing a roof panel and a side panel in their open positions whereby to permit access to the interior of the greenhouse.
Figure 3:
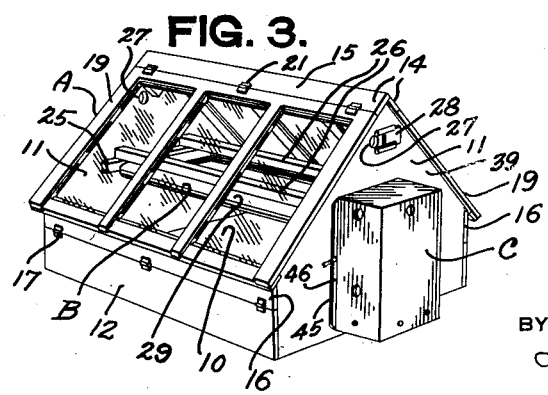
Figure 3 is a perspective view of the improved greenhouse, but with the seed or plant boxes shown in Figures 1 and 2 removed in order to show the interior structure of the greenhouse.
Figure 4:
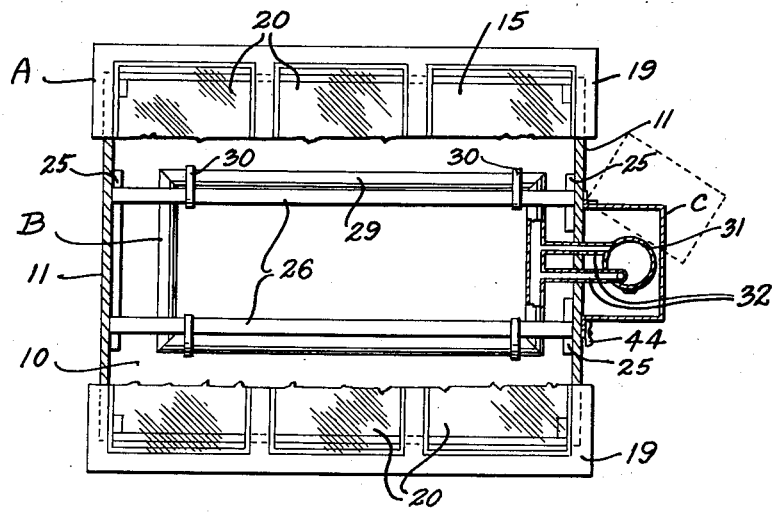
Figure 4 is a top view of the greenhouse partly in plan and partly in horizontal section.
Figure 5:
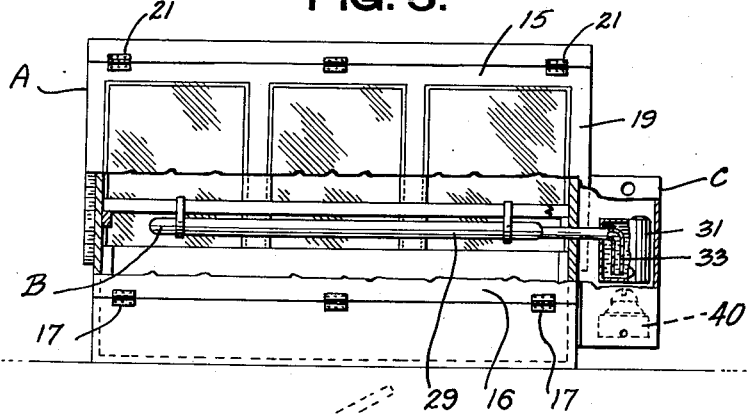
Figure 5 is a side view of the greenhouse partly in elevation and partly in vertical section.

In the drawings wherein for the purpose of illustration is shown only a preferred embodiment of the invention and wherein similar reference characters designate corresponding parts thruout the several views, the letter A may generally designate the improved greenhouse, provided with a heating system B and a boiler housing C.

Figure 6:
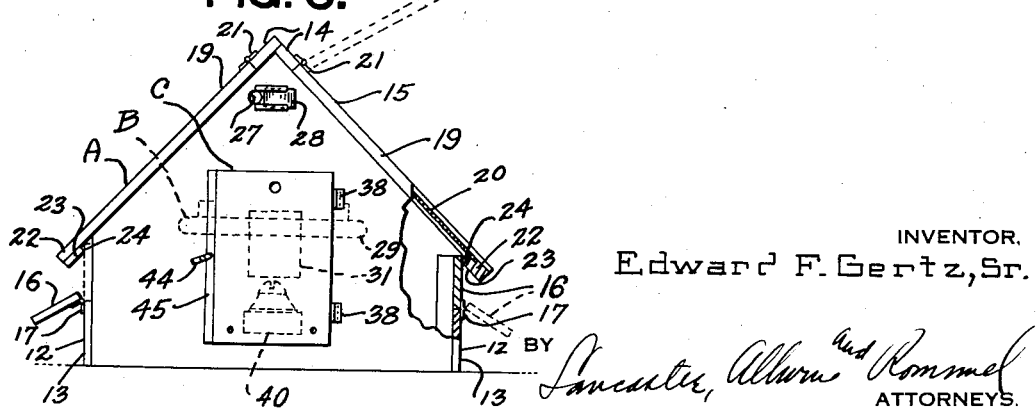
Figure 6 is an end view of the greenhouse partly in elevation and partly in vertical section.

The greenhouse A may include a bottom floor 10, a pair of gable ends 11 extending upwardly at opposite ends of the floor, a pair of baseboards 12 extending upwardly at opposite sides of the floor and forming a covering for the lower portions only of the sides 13 of the greenhouse, and a pair of ridgeboards 14 extending between the gable ends and secured to the oppositely inclined surfaces thereof and forming a covering for a ridge portion only of the gable roof 15 of the greenhouse. Cooperating with the baseboards 12 to completely cover or enclose the opposite sides of the greenhouse is a pair of side panels 16 which are adapted to swing outwardly and downwardly by means of hinges 17 suitably positioned along the lower edges thereof and along the upper edges of the respective baseboards. As for the roof 15, it may comprise a pair of frames 19 fitted with suitable lights 20 permitting the passage of the ultra-violet rays of the sun. These frames 19 are adapted to swing upwardly by means of hinges 21 suitably positioned along the upper edges thereof and along the lower edges of the respective ridgeboards. The frames 19 may include eave portions 22 projecting downwardly and outwardly of the top edges of the side panels 16 and it will be noted from an inspection of the drawings, and particularly Figure 6, that these eave portions 22 are offset from the main body portions of the frames whereby the inner edges 23 of the eave portions form shoulders 24 on the lower sides of the frames. These shoulders 24 are of assistance to the eave portions in holding the side panels 16 in vertical or closed position.

Suitable cleats 25 may be fastened to the interior surfaces of the gable ends for supporting a pair of elongate parallel bars 26 which may span the space between the gable ends in a plane substantially halfway between the floor and ridge of the greenhouse.

At or near the peaks of the gable ends, the greenhouse may be provided with ventilating openings 27 fitted with suitable closures,—the manually operated sliding plate 28 being an example of a preferred closure.

The heating system B may include a hot water tank 29 preferably constructed of cold rolled copper pipes to form a rectangular loop which may be suspended from the bars 26 in a horizontal position therebeneath as by straps 30. Exteriorly of the greenhouse a copper boiler 31 may be provided. This boiler 31 preferably is positioned adjacent a gable end of the greenhouse and it may be operatively connected to the hot water tank 29 by a pair of tubes 32 extending thru the gable end of the greenhouse. One of these tubes 32 may be provided with a downturned end 33 terminating near the bottom of the boiler. The boiler may be provided with a drain plug 34 and a filling plug 35.

Referring to the boiler housing C, it is preferably box-shaped and may be made of sheet metal, one side 36 being open. Along a corner edge 37 adjacent this open side, the housing may be attached by hinges 38 to the boiler end 39 of the greenhouse, whereby the housing will swing into and out of enclosing relation to the boiler, the arrangement being such that the boiler will be positioned in the upper portion of the housing. An oil burner 40 may be removably positioned on the base 41 of the housing as by suitably spaced cleats 42. When the housing is swung into enclosing relation to the boiler, the oil burner will be carried therewith and will be positioned in an efficient heating position beneath the boiler. Apertures 43 may be provided in the housing for creating a draft therein and a button 44 may be rotatably mounted on the boiler end 39 of the greenhouse for cooperation with a flange 45 projecting from a corner edge 46 of the housing to releasably secure the housing in its closed position.

The boiler end 39 of the greenhouse may be provided with an electric socket 47 a suitable distance below the boiler and in which an electric heating cone (not shown) may be removably mounted for heating the boiler. When this heating cone is used, the oil burner 40 may be removed from the housing whereby the housing will swing into and out of enclosing relation to both the boiler and the heating cone. If desired, the heating cone may be thermostatically controlled to prevent the temperature within the greenhouse from falling to the freezing point.

The bottom floor 10 constitutes a main plant support which is adapted to support seeds or plants beneath the heating tank 29 while the bars 26 form an auxiliary plant support which may serve to support other seeds or plants above the tank. These are preferably carried in boxes 49. In the arrangement of boxes shown, a single row of boxes is supported on the bars 26 in terraced relation to a double row resting on the floor 10. Access to the interior of the greenhouse may be had by merely lifting either of the roof frames 19 upwardly and backwardly until the same rests upon the ridge board to which it is hinged. One of the frames 19 having been raised, the side panel normally associated therewith may be swung downwardly, thereby permitting access to both the upper and lower portions of the greenhouse. The side panel may be permitted to remain open as for ventilating purposes without preventing the roof frame from being returned to its normal position.

The boiler and boiler heater may be inspected and cared for by merely swinging the housing out of enclosing relation to the boiler. If the oil burner is utilized, this may be adjusted and lighted without removing same from the housing due to the accessibility of the same when the housing is swung out as shown in Figure 1.

Various changes may be made to the form of invention herein shown and described without departing from the spirit of the invention or the scope of the following claims.

I claim:

1. A plant starter including a main plant support in the lower portion thereof, an auxiliary plant support in the upper portion thereof, and a heating element carried by the auxiliary support in subjacent relation thereto.

2. The combination with a portable greenhouse having a pair of spaced apart walls, of means spanning the space between said walls, said means being positioned in a plane intermediate the top and bottom portions of said greenhouse whereby to provide a support for articles in the upper portion of the greenhouse, and an elongate heating device horizontally supported by said means in subjacent relation thereto.

3. In a portable greenhouse including a bottom floor providing a support in the lower portion of the greenhouse, a pair of walls extending upwardly of said floor and a roof supported by said walls, means spanning the space between said walls, said means being positioned in a plane intermediate said floor and said roof, whereby to provide a support in the upper portion of the greenhouse and a heat radiator supported in subjacent relation to said means whereby to radiate heat downwardly towards said floor and upwardly towards said roof.

4. A plant starter including a side panel and a roof panel downwardly inclining towards and overhanging said side panel, said roof panel being hinged along its upper edge and adapted to swing upwardly, said side panel being hinged at its lower edge and adapted to swing downwardly, said roof panel normally preventing the downward swinging of said side panel.

5. A device of the class described comprising a pair of gable ends, a pair of side panels and a pair of roof panels, said gable ends and said side and roof panels forming a house, said side panels being hinged at their lower edges to swing downwardly, and said roof panels being hinged at their upper edges to swing upwardly, said roof panels including overhanging eaves.

6. A device of the class described comprising a pair of gable ends, a pair of side panels and a pair of roof panels, said gable ends and said side and roof panels forming a house, at least one of said side panels being hinged to swing downwardly, its associated roof panel being hinged to swing upwardly, said roof panel having an eave portion normally overhanging said side panel.

7. A portable greenhouse having a heating boiler adjacent a wall thereof, a box-like housing hingedly secured to said wall and normally enclosing said boiler in the upper portion thereof, and a heating element normally positioned in the lower portion of said housing and beneath said boiler.

8. A greenhouse of the character described including a heating boiler exteriorly thereof, a box-like housing hingedly secured to the exterior of said greenhouse, and normally accommodating said boiler in the upper portion of said housing, and a burner supported in the lower portion of said housing and normally positioned underneath said boiler.

9. A portable greenhouse provided with a heating boiler adjacent a wall thereof, a box-like housing hingedly secured to said wall, said housing being provided with an open side adjacent said wall, whereby said housing is adapted to enclose said boiler in the upper portion thereof, and a heating device carried in the lower portion of said housing, whereby said heating device will be positioned in cooperative relation to said boiler upon swinging of said housing into enclosing relation to said boiler.

EDWARD F. GERTZ, Sr.